Figure 1:
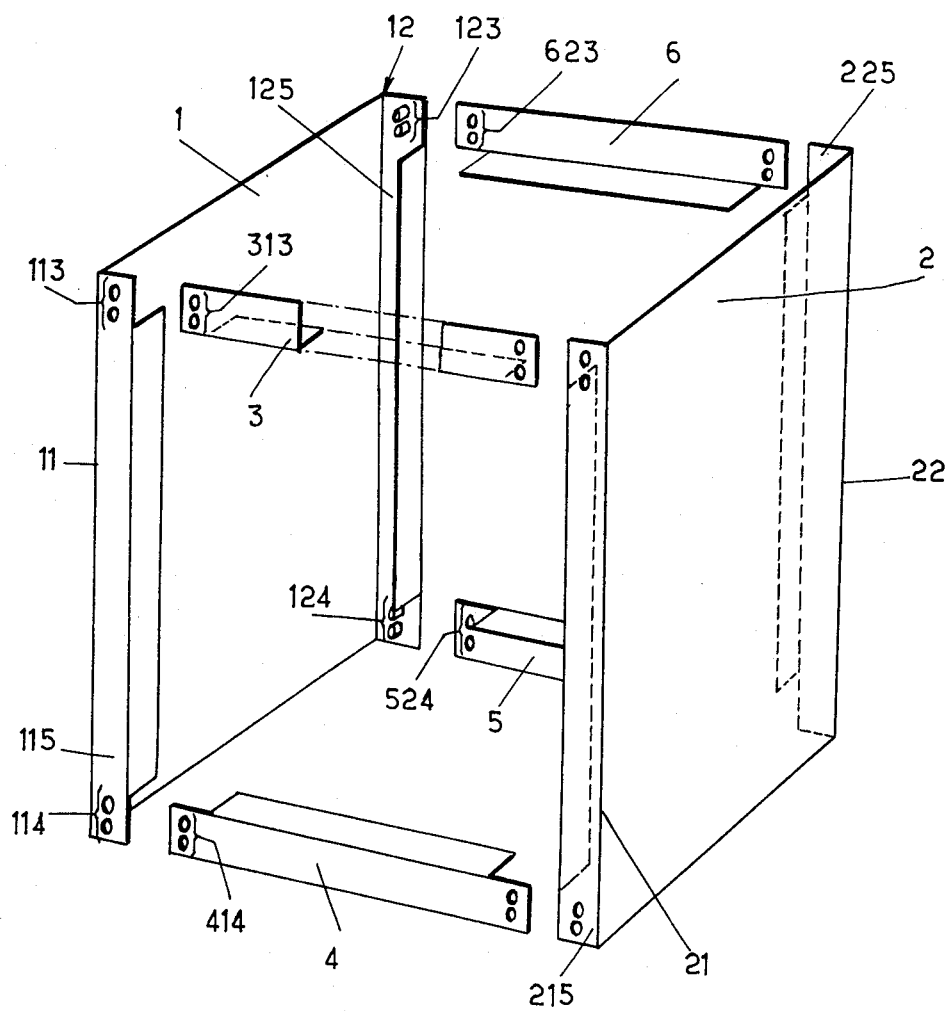

United States Patent [19]

Lascarrou

[11] 4,040,694

[45] Aug. 9, 1977

[54] FRAMEWORK FOR METAL CABINET

[75] Inventor: Alain Lascarrou, Epinay-sur-Seine, France

[73] Assignee: La Telemecanique Electrique, France

[21] Appl. No.: 637,256

[22] Filed: Dec. 3, 1975

[30] Foreign Application Priority Data

Dec. 12, 1974 France .................................. 74.40883

[51] Int. Cl.² ....................... A47B 47/02; F16B 21/00
[52] U.S. Cl. ............................. 312/263; 312/257 SK;
403/376; 403/408
[58] Field of Search ............................ 52/648, 758 D;
312/257 R, 257 SK, 263, 320

[56] References Cited

U.S. PATENT DOCUMENTS

| 1,986,981 | 1/1936 | Ross | 52/758 D |
| 2,302,772 | 11/1942 | Huck | 52/758 D |
| 2,710,784 | 6/1955 | Morin | 312/257 SK |
| 2,986,244 | 5/1961 | Hutchison | 52/758 D |
| 3,186,782 | 6/1965 | Ullman | 312/263 |

Primary Examiner—Casmir A. Nunberg
Attorney, Agent, or Firm—William Anthony Drucker

[57] ABSTRACT

Cabinet and cubicle formed by assembling framework members having at their ends on the one hand two cylindrical openings, and on the other two conical cylindrical projections which are centered in the said openings, whereby a screw traverses each projection to ensure the fastening by means of a nut which is supported on the edges of the opening.

4 Claims, 3 Drawing Figures

FRAMEWORK FOR METAL CABINET

The invention relates to a metal enclosure such as a cabinet or cubicle for electrical equipment comprising a framework formed by the assembly of elements composed of vertical posts and horizontal cross-arms, the said elements being interconnected by fastening means located at the end of the said elements.

Systems are already known which use framework elements whose ends which are to be assembled carry conical projections and conical recesses which cooperate with one another to ensure the centering, whilst a common fastening member traverses each projection and each cooperating recess to ensure the fastening thereof.

These systems have the disadvantage that two nested conical portions do not have an adequate shear strength but instead tend to slide upon one another when a load perpendicular to the axis is applied. As a function of the cone angle, this load has the effect of a large axial stress which causes a slackening of the fastening member.

Therefore lateral loads applied to a cabinet incorporating such systems lead to a warping of the frame and bring about secondary disadvantages such as the doors coming out of alignment which prevents their opening or closing, the breaking of internal parts, etc.

The object of the invention is to obviate the above disadvantages and more particularly to provide assembling means which ensure a very precise centring, whilst ensuring that the thus formed housing has a mechanical rigidity such that the geometry of the cabinet framework retains its original properties.

According to the invention, this result is obtained through the fastening means having on at least a first element two circular holes whereby each is fitted onto a first projecting cylindrical portion which is integral with the second element and whose height is close to the thickness of the metal sheeting of the first element, whilst a second conical portion extending the first portion internally receives the head of a screw which is engaged in a nut bearing round the hole.

Figure 2:
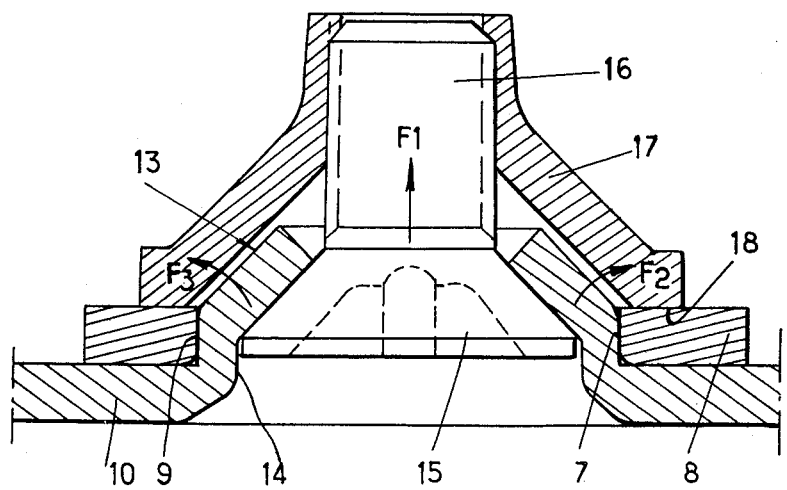
Figure 3:
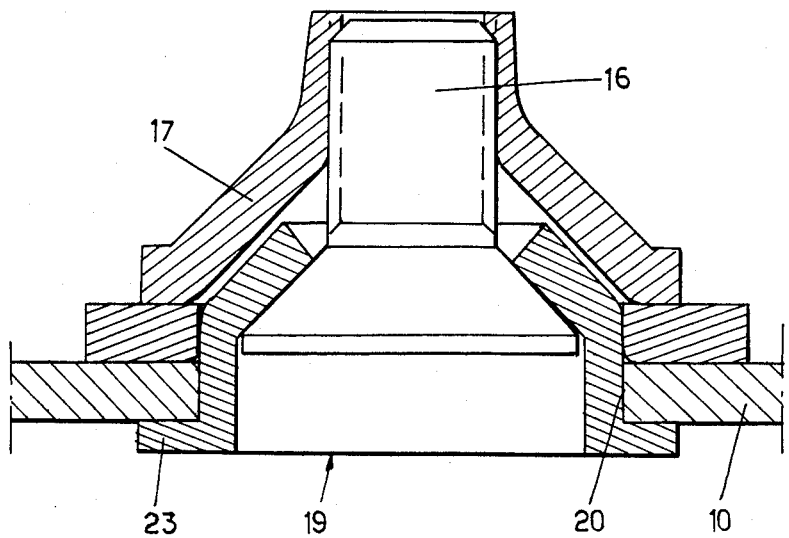

The invention will be better understood from reading the following description with reference to the drawings, wherein show:

FIG. 1, a perspective view of a type of framework using the means according to the invention;

FIG. 2, in section, a preferred embodiment of the means according to the invention;

FIG. 3, a variant of the means described in FIG. 2.

Referring firstly to FIG. 1, 1 and 2 are two side walls of a metal cabinet having vertical posts 11, 12, 21, 22 which are interconnected by at least four horizontal cross-arms such as 3, 4, 5, 6, whereby these members represent the members of a framework which will be subsequently supplemented by racks, a ceiling, a floor etc.

Although in the present embodiment the side walls are integral with posts 11, 12 or 21, 22, the means of the invention to be described hereinafter are applicable in the case where these posts are independent instead of being interconnected pairwise. In the latter case the posts placed on one side (right or left) will in turn be interconnected by other horizontal cross-arms.

In the case illustrated in FIG. 1, the vertical posts 11, 12, 21, 22 each comprises a vertical wall 115 or 125, 215, 225 at the two ends of which are provided inwardly directed projections. For simplicity of viewing, only those on the left-hand posts have been shown, whereby they are arranged in pairs 113, 114 or 123, 124.

These projections cooperate with pairs of holes 414, 524, 313 and 623 made on the ends of cross-arms 4, 5, 3 and 6.

Sets of identical projections and holes are made on the posts to the right as well as on the ends of the cross-arms which cooperate therewith.

FIG. 2 shows the centring and fastening means which respectively comprise in the case of the centring means a circular opening 7 made by drilling end 8 of the cross-arm, a first cylindrical portion 9 integral with wall 10 of the post and fitted onto the opening, and in the case of the fastening members a second portion 13 which is frusto-conical and extends the first portion receiving in an inner recess 14 the head 15 of a screw 16 which is engaged in a nut 17 whose bearing surface 18 bears round opening 7.

This arrangement opposes a sliding movement between post 10 and cross-arm 8 by means of a large annular shearing metal section and therefore prevents any relative movement between the post and the cross-arm.

The shear strength effect is further improved by the presence of the screw head.

It should also be noted that the frusto-conical portion 13 tends to deform during energetic fastening in the direction of the arrow F1 leading to a slight movement of the walls of the first and second portions in a direction opposite to axis XX' and in the direction of arrows F2 and F3.

Consequently the centring and adjusting action is significantly improved during the fastening because the first portion tends to spread in the opening where it is placed.

In FIG. 3 the first and second portions are both included in a annular member 19 which is centred with adjustment in an opening 20 of wall 10 of the post and is held in place by an annular rim 23. This member 19 could also be made integral with wall 10 by tight fitting or by spot welding.

In the case of the framework illustrated in FIG. 1, only the cross-arms in the upper and lower areas of the cabinet are shown. It is obviously possible to use the same principles and centering and adjusting means on the intermediate cross-arms whose ends are fixed in an intermediate area of the posts without exceeding the scope of the invention because the results obtained are the same as those obtained relative to the upper and lower cross-arms.

I claim:

1. A metal enclosure, for electrical equipment, having a frame including:
   i. a plurality of post elements
   ii. a plurality of cross-arm elements at least two of which are utilised to connected pairs of the post elements, and
   iii. means for releasably fastening the post elements to the cross-arm elements with a face of the post element abutting a face of the cross-arm element, said fastening means comprising
      a. a portion of one of said elements having therein a circular hole opening at the abutting face,
      b. a first annular portion extending from the abutting face of the other element and having a cylindrical external face forming a fit in the circular hole,
      c. a second annular portion extending from the first annular portion remote from the abutting face said second annular portion being externally frusto-conical and reducing in diameter in the direction away from said abutting face,
  d. releasable holding means to bear against the two elements to retain the respective faces in abutment.

2. A metal enclosure, as claimed in claim 1, wherein said first annular portion and said second annular portion are both included in an annular member secured to said other element.

3. A metal enclosure, as claimed in claim 1, wherein said releasable holding means comprises (i) a screw having a head and a threaded shank, the head being adapted to seat in the frustro-conical second annular portion, and the shank being adapted to pass with clearance through the frusto-conical second annular portion and to project therefrom, and (b) a nut adapted to engage on said threaded stem and to abut against said one element.

4. A metal enclosure, as claimed in claim 4, wherein said releasable holding means comprises (i) a screw having a head and a threaded shank, the head being adapted to seat in the frusto-conical second annular portion, and the shank being adapted to pass with clearance through the frusto-conical second annular portion and to project therefrom, and (b) a nut adapted to engage on said threaded stem and to abut against said one element.

* * * * *